(12) United States Patent
Nilsen et al.

(10) Patent No.: US 12,147,336 B1
(45) Date of Patent: Nov. 19, 2024

(54) CONCURRENT REMEMBERED SET SCANNING

(71) Applicant: Amazon Technologies, Inc., Seattle, WA (US)

(72) Inventors: Kelvin Don Nilsen, Snoqualmie, WA (US); Bernd Joachim Wolfgang Mathiske, Lynnwood, WA (US); William Kemper, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

(21) Appl. No.: 17/364,294

(22) Filed: Jun. 30, 2021

(51) Int. Cl.
*G06F 12/02* (2006.01)

(52) U.S. Cl.
CPC .... *G06F 12/0253* (2013.01); *G06F 2212/702* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 7,779,054 | B1* | 8/2010 | Printezis | G06F 12/0276 707/819 |
| 2002/0056019 | A1* | 5/2002 | Kolodner | G06F 9/5016 711/170 |
| 2004/0162860 | A1* | 8/2004 | Detlefs | G06F 12/0276 711/E12.012 |
| 2016/0110105 | A1* | 4/2016 | Karamcheti | G06F 13/4282 710/302 |

* cited by examiner

*Primary Examiner* — Richard L Bowen
(74) *Attorney, Agent, or Firm* — Davis Wright Tremaine LLP

(57) ABSTRACT

Systems and methods for performing garbage collection. A system updates a second data structure based at least in part on a first data structure, the first data structure comprising data from a previous garbage collection cycle of a garbage collection application and the second data structure comprising data from a current garbage collection cycle of the garbage collection application. The system allows an application to update the second data structure during the current garbage collection cycle.

20 Claims, 6 Drawing Sheets

CONCURRENT REMEMBERED SET SCANNING

BACKGROUND

Garbage collection is an important process in modern computing systems and environments. In various contexts, garbage collection is utilized to manage memory for applications and to delete unused objects to free up memory. In some cases, garbage collection comprises various processes that require applications to pause execution. This can result in situations where applications can fail to perform various processes within particular time intervals due to the pauses. Performing various garbage collection processes concurrently with various application processes is complex and involves a significant amount of time and resources to ensure coordination between the garbage collection processes and the application processes.

BRIEF DESCRIPTION OF THE DRAWINGS

Various techniques will be described with reference to the drawings, in which.

DETAILED DESCRIPTION

Figure 1:
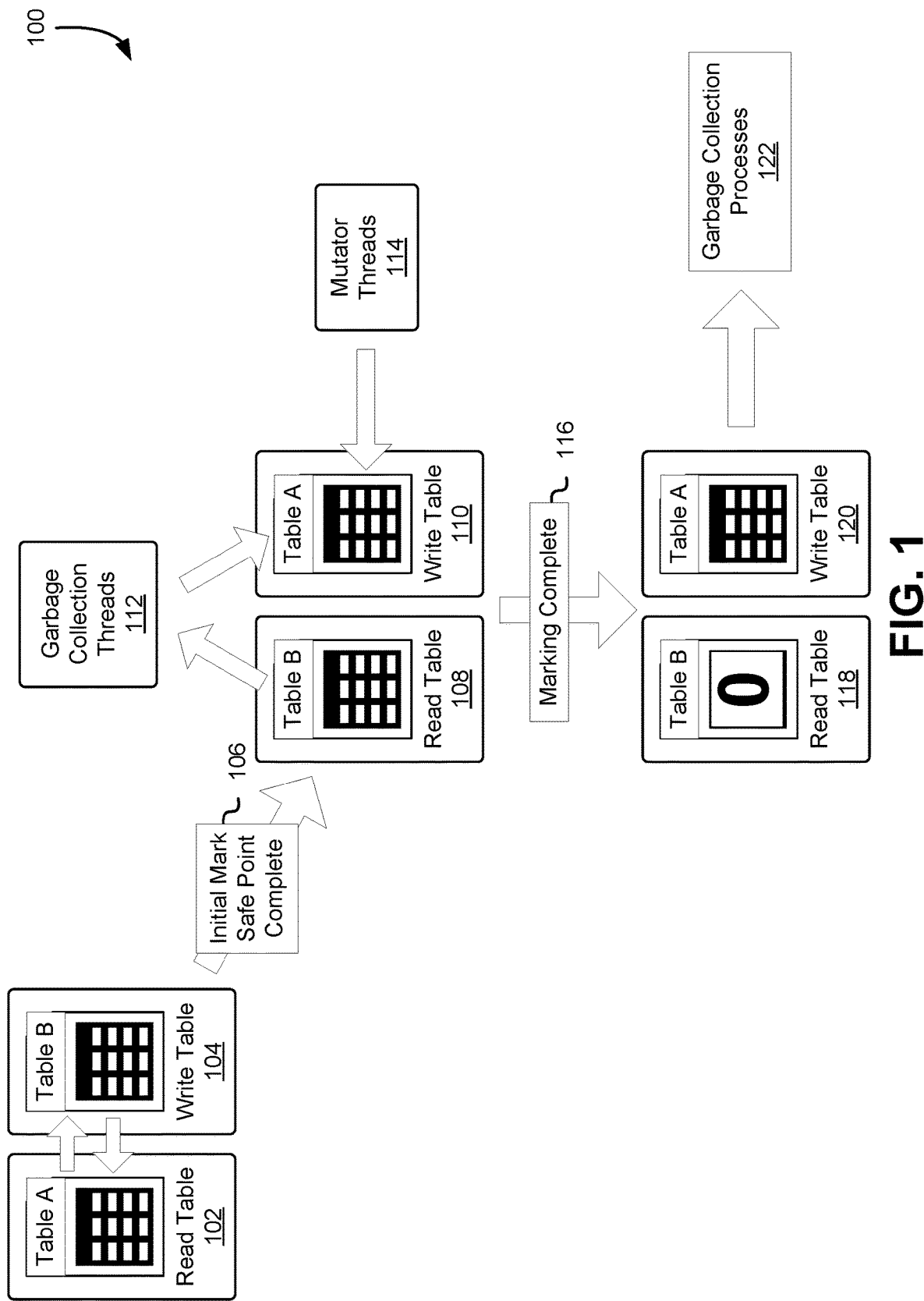
FIG. 1 shows an illustrative example of a concurrent remembered set scanning process, in accordance with at least one embodiment.

Techniques described herein include systems, methods, and techniques to perform remembered set scanning concurrently with execution of mutator threads. In various embodiments, a garbage collector is a program that manages memory for various computer software, applications, programs, and the like. A garbage collector can perform garbage collection, which refers to a process in which unused software objects are identified and deleted to reclaim memory used by the unused software objects. A garbage collector can perform garbage collection for an application to reclaim memory used by objects not in use by the application. Garbage collection can comprise various phases. For example, a garbage collector performs garbage collection comprising a marking phase, in which used software objects, also referred to as live objects, are identified, an evacuation phase, in which live objects in particular regions of memory are moved, also referred to as evacuated, to other regions such that the particular regions of memory can be used for future objects, and an update references phase, in which references to evacuated live objects are updated to the new locations of the live objects. In some examples, a garbage collector divides a memory space for objects of an application, also referred to as a heap, into a young generation space, in which newly allocated objects exist, and an old generation space, in which objects that have persisted through various passes of the garbage collector exist. A garbage collector can perform garbage collection for a young generation space, also referred to as young generation garbage collection, and for an old generation space, also referred to as old generation garbage collection.

In various embodiments, as part of a marking phase of young generation garbage collection, a garbage collector scans a remembered set to determine references in old generation to objects in young generation. A remembered set can be a data structure that encodes information indicating regions of memory in old generation that can comprise references to objects in young generation. A remembered set can be represented by a card table, which can be an array of bytes, in which each byte is referred to as a card and corresponds to a particular memory region (e.g., a range of memory addresses). A garbage collector can scan a remembered set to mark live objects in young generation by marking objects in the young generation that are referenced by objects in particular memory regions in old generation indicated by the remembered set.

A garbage collector can perform remembered set scanning concurrently with execution of mutator threads. A garbage collector can maintain two card tables. A first card table can be identified as a read table, and a second card table can be identified as a write table. At the start of a marking phase of young generation garbage collection, the garbage collector can swap the roles of the read table and the write table. For example, the garbage collector can now identify the first card table as the write table, and the second card table as the read table. The garbage collector can then, as part of the marking phase, utilize the read table to determine regions of memory to scan. The garbage collector can determine cards of the read table that are marked, also referred to as dirty. The dirty cards of the read table can correspond to regions of memory in old generation that can comprise references to young generation objects. The garbage collector can scan regions of memory indicated by the dirty cards of the read table to determine whether the regions of memory comprise any references to any objects in the young generation.

The garbage collector can mark corresponding cards in the write table based on analysis of memory regions indicated by the dirty cards of the read table. The garbage collector can mark a card in the write table if a memory region indicated by the card comprises any references to any objects in the young generation. For example, the read table comprises a first dirty card corresponding to a first memory region in the old generation, in which the write table comprises a corresponding card also corresponding to the first memory region, in which the garbage collector scans the first memory region and determines whether the first memory region comprises any references to any objects in the young generation. Continuing with the example, the garbage collector marks the corresponding card in the write table if the first memory region comprises any references to any objects in the young generation, or does not mark the corresponding card in the write table if the first memory region does not comprise any references to any objects in the young generation.

Mutator threads can execute concurrently while the garbage collector scans the memory regions indicated by the dirty cards of the read table. The mutator threads can perform various processes of an application while executing. In some examples, the mutator threads write various references to objects in the young generation in the old generation. A reference can refer to data that indicates a location of an object in memory. The mutator threads can also mark the write table concurrently with the garbage collector. For example, an executing first mutator thread writes a reference to an object in the young generation in a particular memory region in the old generation, in which the first mutator thread marks a card in the write table corresponding to the particular memory region. Both the garbage collector and the mutator threads can concurrently mark one or more cards in the write table as part of the marking phase. As the marking phase concludes, the garbage collector can zero out the contents of the read table in preparation for subsequent garbage collection phases.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: providing an ability to scan a remembered set concurrently with execution of mutator threads; improving performance of a garbage collector by providing abilities for the garbage collector to scan a remembered set concurrently as mutator threads execute; reducing pause times of an application by providing abilities for the application to execute while a garbage collector scans a remembered set, as well as various other advantages.

FIG. 1 shows an illustrative example 100 of a concurrent remembered set scanning process, in accordance with at least one embodiment. In an embodiment, one or more processes of example 100 are performed by a system such as a garbage collector. Example 100 can include one or more processes of young generation garbage collection. A garbage collector can be a collection of one or more hardware and/or software resources with instructions that, when executed, performs various computer memory management processes such as those described herein. A garbage collector can be implemented using any suitable programming language, such as Java, Python, JavaScript, C#, Ruby, Go, or any suitable language. A garbage collector can perform various processes to reclaim memory used by unused objects of an application. In various embodiments, one or more processes of example 100 are performed by any suitable computer software, applications, programs, or any suitable entity, and in any suitable order, including sequential, parallel, and/or variations thereof.

In an embodiment, example 100 includes a sequence of processes performed by a garbage collector. For example, as part of a garbage collection pass, a garbage collector performs various processes including some in connection with a read table 102 and a write table 104 until an initial mark safe point is complete 106, then performs additional various processes including some in connection with a read table 108 and a write table 110, and garbage collection threads 112 and mutator threads 114, until marking is complete 116, and then performs various processes including some in connection with a read table 118 and a write table 120, and garbage collection processes 122 to complete the garbage collection pass.

In an embodiment, example 100 includes one or more processes of a marking phase of a garbage collection pass. A marking phase can comprise various phases, such as an initial mark safe point, concurrent marking, a final mark point, and/or other phases. An initial mark safe point can be a phase in a marking phase in which execution of an application is temporarily paused. In an initial mark safe point, a garbage collector can determine live objects by analyzing objects utilized by an application. An object can refer to any suitable computer object, such as a variable, data structure, function, method, instance of a class, and/or variations thereof. A live object can refer to an object that is in use by one or more processes of an application. A live object can be an object that is referenced by one or more other objects. A concurrent marking phase can be a phase in a marking phase in which a garbage collector runs concurrently with an application. In a concurrent marking phase, a garbage collector can further determine live objects by scanning a remembered set. A final mark point can be a phase in a marking phase in which execution of an application is temporarily paused. In a final mark point, a garbage collector can further determine live objects, and determine various memory regions that comprise live objects to evacuate; the various memory regions can be referred to as a collection set. A garbage collector can perform concurrent remembered set scanning in a concurrent marking phase, or any suitable phase of a garbage collection pass.

A remembered set can be represented by a card table. A card table can be a type of remembered set. A card table can be any suitable data structure that encodes data indicating one or more regions of memory, such as an array. A card table can be an array of bytes, in which each byte can be referred to as a card and can correspond to a memory region. In an embodiment, a card table is an array of any suitable size, in which each entry of the array is referred to as a card and corresponds to a memory region. A memory region, also referred to as a region, can be a region of memory indicated by a range of memory addresses. A memory region can be a region of memory such as a memory page. In an embodiment, a card table comprises one or more cards that each indicate a memory region in old generation, or any suitable generation. A card can be dirtied, also referred to as marked, which can refer to a process in which one or more values are written to the card to indicate that a memory region corresponding to the card comprises a reference to an object in young generation; a dirty/marked card can refer to a card that corresponds to a memory region that comprises and/or comprised a reference to an object in young generation.

A reference can refer to data that indicates a location in memory. A location in memory can be indicated by a memory address of the location. For example, a reference indicates a location in memory by comprising a memory address of the location. A reference to an object can be a reference that indicates a location of the object. An object, such as a variable, can store or otherwise encode a reference to another object; the object can be referred to as referencing the other object. A card that is dirty/marked can comprise one or more indications (e.g., one or more bits with a value of 1, or any suitable value) that indicate that the card is dirty/marked. For example, a card is dirtied/marked by writing one or more indications (e.g., one or more values of 1, or any suitable value) to the card to indicate that the card is dirty/marked. Similarly, for example, a card is un-dirtied/unmarked by overwriting one or more indications of the card that indicate that the card is dirty/marked with one or more values of 0, or any suitable value, to indicate that the card is not dirty or marked anymore. A dirty/marked card can indicate a memory region that had one or more references to one or more objects stored in young generation in a previous garbage collection cycle. A card table can indicate various regions of memory in old generation.

A garbage collector can maintain two card tables. The card tables can be arrays. A garbage collector can instantiate and store a first card table and a second card table. For example, referring to FIG. 1, a first card table is denoted by "Table A" and a second card table is denoted by "Table B." Card tables can be denoted using any suitable terminology, such as "Table 0" and "Table 1," a first data structure and a second data structure, and/or variations thereof. In an embodiment, a read table 102 and a write table 104 are identifiers that indicate card tables. A read table identifier can indicate an inactive status of a card table. For example, a card table is set to an inactive status by setting a read table identifier to indicate the card table. A card table that is set to an inactive status can refer to a card table that is indicated by a read table identifier. A write table identifier can indicate an active status of a card table. For example, a card table is set to an active status by setting a write table identifier to indicate the card table. A card table that is set to an active status can refer to a card table that is indicated by a write table identifier.

A read table 102 can indicate a first card table and a write table 104 can indicate a second card table. A card table that is indicated by a read table identifier (e.g., a read table 102, a read table 108, and/or a read table 118) can be identified or otherwise referred to as a read table, an inactive copy, an inactive table, and/or variations thereof. A card table that is indicated by a write table identifier (e.g., a write table 104, a write table 110, and/or a write table 120) can be identified or otherwise referred to as a write table, an active copy, an active table, and/or variations thereof. An identifier can indicate a card table through a pointer or other reference to the card table. In some embodiments, an identifier is a variable that comprises or otherwise encodes a reference (e.g., a reference to a card table). A read table 102, a read table 108, and/or a read table 118 can each be the same or different identifier, and can each indicate different card tables/versions of card tables based on one or more garbage collection processes. A write table 104, a write table 110, and/or a write table 120 can each be the same or different identifier, and can each indicate different card tables/versions of card tables based on one or more garbage collection processes.

As part of an initial mark safe point, a garbage collector can swap the roles of a card table (e.g., "Table A" in FIG. 1) indicated by a read table 102 and a card table (e.g., "Table B" in FIG. 1) indicated by a write table 104. A garbage collector can change a read table 102 to indicate a card table denoted by "Table B" and change a write table 104 to indicate a card table denoted by "Table A." In some examples, a garbage collector performs a pointer exchange operation to swap the roles of a card table indicated by a read table 102 and a card table indicated by a write table 104. For example, a read table 102 indicates a first card table denoted by "Table A" using a first pointer/reference to the first card table, and a write table 104 indicates a second card table denoted by "Table B" using a second pointer/reference to the second card table, in which a garbage collector swaps the first pointer/reference and the second pointer/reference. A garbage collector can swap a card table indicated by a read table 102 and a card table indicated by a write table 104. In an embodiment, a read table 108 is an identifier that indicates a card table denoted by "Table B," and a write table 110 is an identifier that indicates a card table denoted by "Table A." A garbage collector can perform various other processes as part of an initial mark safe point, such as identifying various live objects, or other processes; further information regarding a marking phase can be found in the description of FIG. 3. A garbage collector can determine an initial mark safe point is complete by determining that one or more processes of the initial mark safe point have completed. An initial mark safe point complete 106 can indicate a completion of one or more processes of an initial mark safe point.

Following completion of an initial mark safe point 106, a garbage collector can begin concurrent marking. In an embodiment, garbage collection threads 112 are one or more threads of a garbage collector. In an embodiment, a thread or thread of execution is a set of instructions. A thread can be a set of instructions part of one or more processes of various computer software, applications, programs, and/or variations thereof. Garbage collection threads 112 can perform various processes of a garbage collector. Garbage collection threads 112 can mark cards of a card table indicated by a write table 110 based on marked cards of a card table indicated by a read table 108. Garbage collection threads 112 can analyze one or more memory regions corresponding to one or more marked cards of a card table indicated by a read table 108. Garbage collection threads 112 can mark a card in a card table indicated by a write table 110 if a memory region indicated by the card comprises any references to any objects in young generation. For example, a card table indicated by a read table 108 comprises a first dirty card corresponding to a first memory region in old generation, in which a card table indicated by a write table 110 comprises a corresponding card also corresponding to the first memory region, in which one or more threads of garbage collection threads 112 scan the first memory region and determine whether the first memory region comprises any references to any objects in young generation, and mark the corresponding card in the card table indicated by the write table 110 if the first memory region comprises any references to any objects in the young generation, or not mark the corresponding card in the card table indicated by the write table 110 if the first memory region does not comprise any references to any objects in the young generation. Garbage collection threads 112 can determine if a particular memory region comprises any references to any objects in young generation by determining if the particular memory region comprises any objects that reference any objects in the young generation. An object can reference another object by encoding or otherwise storing a reference to the other object.

A garbage collector can allow an application (e.g., via mutator threads 114) to update a card table indicated by a write table 110 concurrently with the garbage collector by utilizing two card tables. In an embodiment, a garbage collector does not block an application from executing while marking cards of a card table indicated by a write table 110 based on marked cards of a card table indicated by a read table 108; the garbage collector does not block the application from accessing and/or writing to the card table indicated by the write table 110. An application (e.g., via mutator threads 114) can operate while a garbage collector processes a card table indicated by a write table 110 and a card table indicated by a read table 108 without pausing, in which the application can access and/or write to the card table indicated by the write table 110. A garbage collector can utilize a card table indicated by a read table 108 to determine one or more memory regions to scan, and update a card table indicated by a write table 110 based on results of the scanning. Concurrently, an application can also update a card table indicated by a write table 110. Because of the use of two card tables, a garbage collector can determine one or more memory regions to scan while allowing an application to execute and also write to memory, as the garbage collector has access to a first table as a reference to determine the one or more memory regions to scan, and a second table in which both the garbage collector and the application can write to. In an embodiment, a card table indicated by a write table 110 initially comprises no marked cards, in which both a garbage collector and an application can write to the card table indicated by the write table 110 to indicate memory regions that comprise references to young generation objects in a current garbage collection cycle; following completion of the current garbage collection cycle, the card table indicated by the write table 110 can then comprise indications of the memory regions that comprised references to young generation objects in the current garbage collection cycle, and can be utilized as a reference in a subsequent garbage collection cycle.

Mutator threads 114 can execute concurrently while one or more threads of garbage collection threads 112 scan one or more memory regions indicated by one or more dirty cards of a card table indicated by a read table 108. A mutator can refer to a program that mutates or otherwise modifies a heap. In some examples, a mutator thread corresponds to one or more processes of an application. A mutator thread can write references in old generation to objects in young generation. In an embodiment, mutator threads 114 are one or more threads of an application. An application can be executing in which a garbage collector can determine objects used by the application to reclaim memory regions that are no longer used by the application. Mutator threads 114 can perform various processes of an application while executing. Mutator threads 114 can perform various processes that comprise writing or otherwise storing various references, such as pointer values, in old generation that reference objects in young generation. Mutator threads 114 can write a reference in old generation by modifying an object in the old generation with the reference (e.g., overwriting an existing reference of the object with the reference), writing an object in the old generation comprising or otherwise encoding the reference, and/or any suitable manner. For example, one or more threads of mutator threads 114 write a reference to an object in young generation in old generation by overwriting an existing reference of an object stored in the old generation, such as a variable, with the reference to the object in the young generation.

Mutator threads 114 can mark a card table indicated by a write table 110 concurrently with garbage collection threads 112. Mutator threads 114 can mark one or more cards in a card table indicated by a write table 110 corresponding to a second set of memory regions where the mutator threads 114 write one or more references to one or more objects in young generation. For example, an executing first mutator thread of mutator threads 114 writes a reference to an object in young generation in a particular memory region in old generation, in which the first mutator thread marks a card in a card table indicated by a write table 110 corresponding to the particular memory region. One or more threads of garbage collection threads 112 and one or more threads of mutator threads 114 can concurrently mark one or more cards in a card table indicated by a write table 110 as part of a concurrent marking phase. Garbage collection threads 112 can scan one or more appropriate memory regions (e.g., indicated by one or more dirty cards of a card table indicated by a read table 108) and mark one or more appropriate cards (e.g., a card corresponding to a memory region that comprises a reference to an object in young generation) in a card table indicated by a write table 110 concurrently while mutator threads 114 execute, which can also mark one or more appropriate cards (e.g., a card corresponding to a memory region where the mutator threads 114 write a reference to an object in young generation) in the card table indicated by the write table 110; this process can be collectively referred to as concurrent remembered set scanning.

A garbage collector can determine when marking is complete. In an embodiment, marking complete 116 indicates a state in which one or more phases of a marking phase are completed. Marking complete 116 can indicate a state after concurrent marking is completed. Concurrent marking can be complete after a garbage collector (e.g., via one or more threads of garbage collection threads 112) scans each dirty card of a card table indicated by a read table 108. In some examples, concurrent marking is complete after a defined time interval, after a defined number of live objects are determined, after a defined number of memory regions are scanned, and/or based on any suitable logic, heuristics, rules, and the like.

After a garbage collector determines that marking is complete 116, the garbage collector can zero out contents of a card table indicated by a read table 108. A garbage collector can zero out contents of a card table by setting each value of the card table to a value of zero. A garbage collector can zero out contents of a card table by overwriting each value of the card table to a value of zero, or any suitable value. A garbage collector can zero out contents of a card table by changing values of one or more bits of each card of the card table to 0, or any suitable value, such that each card of the card table is not marked. In some examples, marking complete 116 indicates when a marking phase is complete, in which a garbage collector zeros out contents of a card table indicated by a read table 108 after the marking phase. In various embodiments, marking complete 116 indicates when a concurrent marking phase of a marking phase is complete, in which a garbage collector zeros out contents of a card table indicated by a read table 108 after the concurrent marking phase, such as in a final mark phase, or other suitable phase.

A read table 118 can be an identifier that indicates a card table (e.g., a card table indicated by a read table 108) after one or more processes of a concurrent marking phase and after a garbage collector has zeroed out contents of the card table. A write table 120 can be an identifier that indicates a card table (e.g., a card table indicated by a write table 110) after one or more processes of a concurrent marking phase in connection with one or more threads of garbage collection threads 112 and/or one or more threads of mutator threads 114. A garbage collector can then utilize a card table indicated by a read table 118 and a card table indicated by a write table 120 in garbage collection processes 122. In an embodiment, garbage collection processes 122 are one or more processes of one or more garbage collection phases, such as a marking phase, an evacuation phase, an update references phase, and/or various other phases. In some examples, example 100 includes one or more processes of a garbage collection pass and garbage collection processes 122 include one or more processes of the garbage collection pass that complete the garbage collection pass. Further information regarding phases of garbage collection can be found in the description of FIG. 3. In a subsequent garbage collection pass, as part of an initial mark safe point of the subsequent garbage collection pass, a garbage collector can swap a card table indicated by a read table 118 and a card table indicated by a write table 120 through a process such as those described in connection with a read table 102 and a write table 104, and utilize the card tables for various other processes such as those described in connection with FIG. 1 for the subsequent garbage collection pass.

In some examples, a card table indicated by a write table 120 is utilized in an update references phase of garbage collection. A garbage collector can utilize a card table indicated by a write table 120 to determine particular memory regions that comprise references to objects evacuated in an evacuation phase, and update the references to the new locations of the objects. For example, a first memory region indicated by a first dirty card in a card table indicated by a write table 120 comprises a reference to a first location of an object in young generation, in which, as part of an evacuation phase, a garbage collector copies the object to a second location. Continuing with the example, the garbage collector, as part of an update references phase, examines the card table to determine the first dirty card, accesses the first memory region, and updates the reference to reference the second location of the object.

Figure 2:
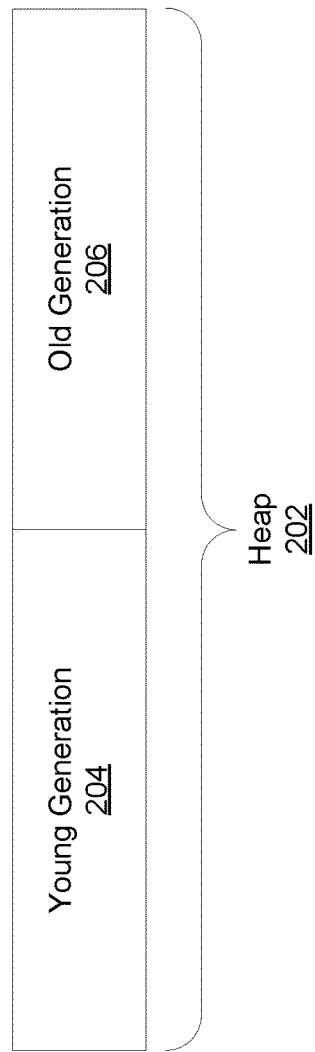
FIG. 2 shows an illustrative example of different memory generations, in accordance with at least one embodiment.

FIG. 2 shows an illustrative example 200 of different memory generations, in accordance with at least one embodiment. In an embodiment, the example 200 includes a heap 202 comprising a young generation 204 and an old generation 206. A heap 202, a young generation 204, and an old generation 206 can be in accordance with those described elsewhere in this disclosure.

In an embodiment, a heap 202 is a region of memory used for dynamic memory allocation. A heap 202 can be utilized by an application to store various objects used by the application. A heap 202 can be a region of random access memory (RAM). An application can allocate memory in a heap 202 to store various objects used by the application. In some examples, a heap 202 is utilized to store global variables. Memory of a heap 202 can be managed by a garbage collector, such as those described in connection with FIG. 1. A heap 202 can be divided into various regions, such as a young generation 204, an old generation 206, and/or other regions not depicted in FIG. 2.

A young generation 204, also referred to as young generation memory, young generation memory regions, and/or variations thereof, can be a region of a heap 202 that can be utilized to store newly allocated objects. A young generation 204 can be one or more regions of memory classified or otherwise denoted as young generation. A young generation 204 can comprise one or more memory regions that are not necessarily contiguous, but can be. In an embodiment, objects that are newly allocated by mutator threads reside within a young generation 204. An application can allocate memory in a young generation 204 to store objects. In some embodiments, a young generation 204 is divided into various regions, such as an Eden space, survivor space, and/or other regions. An Eden space can be a region of a young generation 204 where objects are stored when they are first initialized. An Eden space can be a region where memory is initially allocated for objects. A survivor space can be a region of a young generation 204 where objects that have survived one or more passes of a garbage collector reside. An object that survives a pass of a garbage collector can refer to an object that is live during the pass of the garbage collector. Objects in an Eden space that survive one or more passes of a garbage collector can be moved by one or more systems, such as a garbage collector or other memory management system, to a survivor space as part of one or more garbage collection processes. Objects in an Eden space can be moved to a survivor space after the objects have undergone any suitable number of passes of a garbage collector. A young generation 204 can be designated to store data objects for a defined number of garbage collection cycles (e.g., passes of a garbage collector), after which the data objects can be moved as part of one or more garbage collection processes.

An old generation 206, also referred to as old generation memory, old generation memory regions, and/or variations thereof, can be a region of a heap 202 that can be utilized to store objects that have survived one or more passes of a garbage collector. An old generation 206 can be one or more regions of memory classified or otherwise denoted as old generation. An old generation 206 can comprise one or more memory regions that are not necessarily contiguous, but can be. An old generation 206 can be utilized to store long lived objects. An old generation 206 can be designated to store data objects after a defined number of garbage collection cycles (e.g., passes of a garbage collector). In an embodiment, objects are moved to an old generation 206 from a young generation 204 as part of one or more garbage collection processes after they have survived a defined number of passes of a garbage collector. In some examples, each object is tagged with a 4-bit age. Every time an object survives a defined number of passes of a garbage collector dedicated to its memory area, the object's age can be incremented. The defined number of passes can be any suitable value and can change depending on one or more garbage collection processes. When the age of an object in a young generation 204 reaches a particular threshold value, also referred to as a tenured age, the object can become eligible for promotion into an old generation 206 and can be moved by one or more systems, such as a garbage collector or other memory management system, to the old generation 206 as part of one or more garbage collection processes. In some embodiments, an object is moved from a particular region to another region as part of one or more garbage collection processes such as those of an evacuation phase. For example, as part of evacuating a memory region in an evacuation phase, a garbage collector determines where to move an object (e.g., to move the object to old generation or young generation) based on how many passes of the garbage collector the object has survived.

In various embodiments, the ages of objects in an old generation 206 are monitored, in which age is reset to zero when an object is promoted, which refers to when the object is moved to the old generation 206, and is incremented after a defined number of passes of a garbage collector (e.g., performing old generation garbage collection), which can be any suitable value. In some examples, if one or more systems, such as a garbage collector or other memory management system, observe that recently promoted objects in an old generation 206 are more likely to become garbage than older objects, the one or more systems can adjust a tenure age such that objects are moved to the old generation 206 later (e.g., after more passes of a garbage collector).

A garbage collector can utilize a remembered set to determine objects in an old generation 206 that reference objects in a young generation 204. A garbage collector can scan a remembered set concurrently with execution of mutator threads that can write one or more references in an old generation 206 to one or more objects in a young generation 204. Further information regarding concurrent remembered set scanning can be found in the description of FIG. 1. It should be noted that a heap can comprise any number of generations, including some not depicted in FIG. 2. For example, a heap comprises a young generation, an intermediate generation, and an old generation, in which a garbage collector performs garbage collection for the young generation, the intermediate generation, and the old generation. Continuing with the example, the garbage collector utilizes a first set of card tables for young generation garbage collection, in which a card table of the first set indicates regions of memory in the intermediate generation and the old generation that potentially comprise references to objects in the young generation. Further continuing with the example, the garbage collector utilizes a second set of card tables for intermediate generation garbage collection, in which a card table of the second set indicates regions of memory in the young generation and the old generation that potentially comprise references to objects in the intermediate generation, and so on for old generation garbage collection. Techniques described herein can be applicable to a garbage collector and a heap comprising any number of generations.

Figure 3:
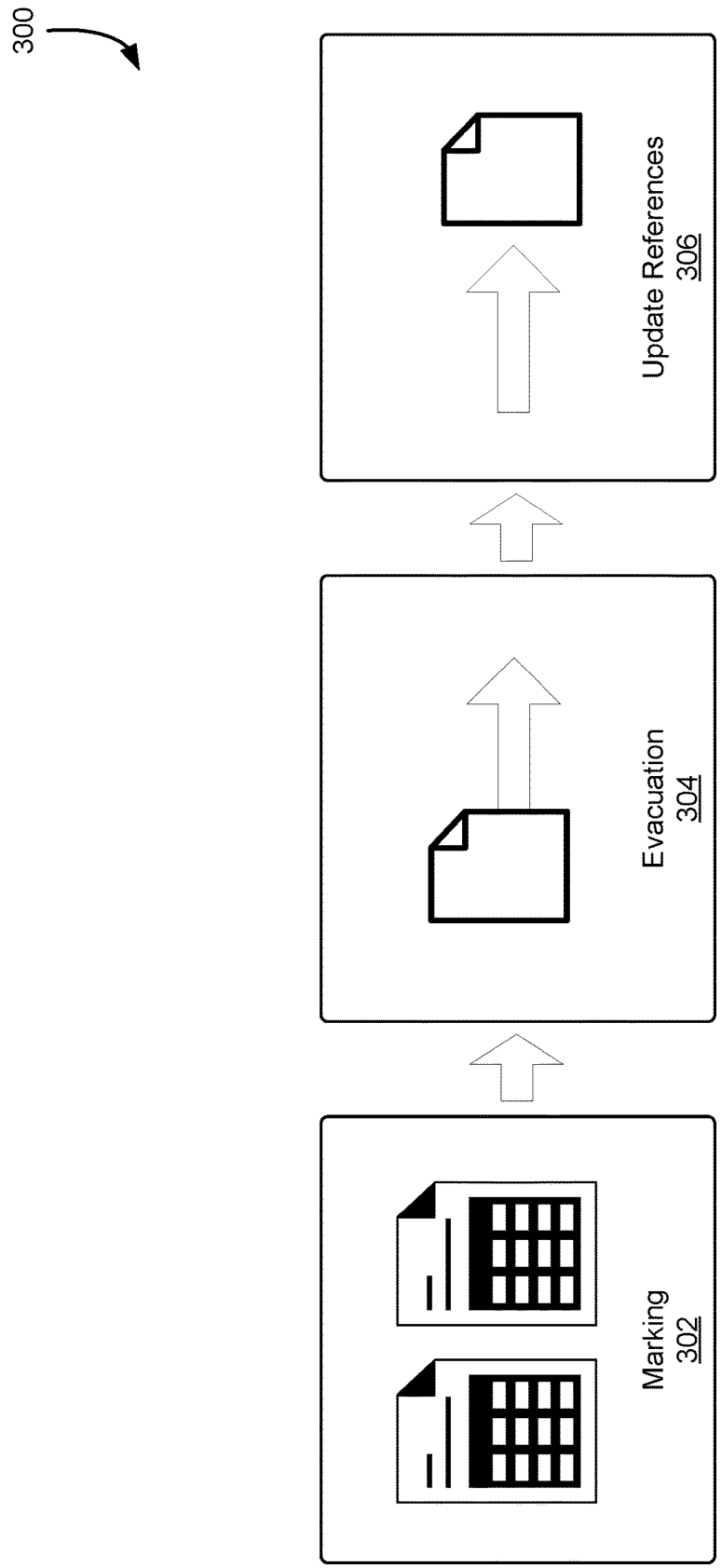
FIG. 3 shows an illustrative example of phases of a garbage collection pass, in accordance with at least one embodiment.

FIG. 3 shows an illustrative example 300 of phases of a garbage collection pass, in accordance with at least one embodiment. The example 300 can include phases of a garbage collector for young generation garbage collection. A single pass of a garbage collector, also referred to as a garbage collection cycle, can comprise a marking 302 phase, an evacuation 304 phase, an update references 306 phase, and/or other phases not depicted in FIG. 3. A marking 302 phase, an evacuation 304 phase, and an update references 306 phase can be in accordance with those described elsewhere in this disclosure.

A marking 302 phase can comprise various phases, such as an initial mark safe point, concurrent marking, a final mark point, and/or other phases. An initial mark safe point, also referred to as initial marking, can be a phase in a marking phase in which execution of an application is temporarily paused. In an initial mark safe point, a garbage collector can determine live objects by analyzing objects utilized by an application. A concurrent marking phase can be a phase in a marking phase in which a garbage collector runs concurrently with an application. In a concurrent marking phase, a garbage collector can further determine live objects by scanning a remembered set. A final mark point, also referred to as final marking, can be a phase in a marking phase in which execution of an application is temporarily paused. In a final mark point, a garbage collector can further determine live objects, and determine various memory regions that can comprise live objects to evacuate; the various memory regions can be referred to as a collection set.

A marking 302 phase can be a phase in garbage collection in which a garbage collector identifies live objects. A live object can refer to an object used or referenced by an application. In a marking 302 phase, a garbage collector can process a root set to determine live objects. A root set can refer to a set of objects that are directly accessible to an application. A root set can comprise various objects, processes, and/or data used by or otherwise accessible to an application, such as local variables, active threads, static variables, references, and/or other suitable data. A garbage collector can scan a root set to determine live objects. A garbage collector can trace a root set to determine live objects by determining objects reachable or otherwise accessible from the root set. A garbage collector can scan a root set in an initial mark safe point, a final mark point, and/or other various phases of a marking 302 phase.

A garbage collector can perform remembered set scanning concurrently with execution of mutator threads in a concurrent marking phase. Further information regarding remembered set scanning can be found in the description of FIG. 1. A garbage collector can maintain two card tables, which can be denoted as a read table and a write table. A garbage collector and mutator threads can indicate in a write table one or more regions of old-generation memory that comprise one or more references to one or more objects in young-generation memory. A garbage collector can mark live objects through remembered set scanning in a concurrent marking phase. For example, for a concurrent marking phase, a garbage collector accesses a first memory region in old generation indicated by a read table, determines the first memory region comprises a reference to an object in young generation, and marks the object in the young generation as live. Mutator threads can also execute concurrently with a garbage collector in a concurrent marking phase. In some examples, when mutator threads write a reference in old generation to an object in young generation, the writing of the reference is recorded and the object in the young generation is marked as live as part of a marking 302 phase. After remembered set scanning is complete, a garbage collector can zero out or otherwise overwrite a read table.

A marking 302 phase can conclude with a final marking phase, in which a garbage collector determines a collection set comprising memory regions to evacuate. A collection set can comprise any suitable number of memory regions. A garbage collector can determine a collection set by determining memory regions with the smallest number of live objects. In some examples, a threshold is defined for a number of live objects such that regions with numbers of live objects fewer than the threshold are chosen to be part of a collection set. In some embodiments, a predefined number of regions comprising the smallest amount of live objects are chosen to be part of a collection set. A garbage collector can determine a collection set based on any suitable logic, functions, heuristics, rules, and/or variations thereof.

An evacuation 304 phase can be a phase in which a garbage collector evacuates particular regions of memory. An evacuated region can refer to a memory region in which all live objects in the memory region have been evacuated. A garbage collector can evacuate a memory region by moving one or more live objects from the memory region to other memory regions. A garbage collector can move an object from a region to a different region by copying the object to the different region. An evacuated object can refer to an object that has been moved from a region (e.g., region of a collection set) to a different region. A garbage collector can evacuate memory regions indicated by a collection set. For example, a garbage collector, for a first memory region of a collection set, copies all live objects in the first memory region to one or more other memory regions not in the collection set, and so on for memory regions of the collection set. In some embodiments, as part of an evacuation 304 phase, references to live objects residing within regions of a collection set are replaced with references to copies of the live objects. In some examples, evacuated memory regions and/or memory regions without any live objects are processed by various memory management operations, such as defragmentation. Evacuated memory regions and/or memory regions without live objects can then be utilized by an application to store objects. An evacuation 304 phase can run concurrently with execution of an application.

An update references 306 phase can be a phase in which a garbage collector updates references stored in old generation that indicate objects that were evacuated in an evacuation 304 phase. A garbage collector can update references that indicate live objects that were copied to other regions in an evacuation 304 phase to indicate the locations of the new copies of the live objects. A garbage collector can utilize a remembered set in an update references 306 phase. A garbage collector can utilize a write table in an update references 306 phase to determine references stored in old generation that indicate live objects that were potentially copied to other regions in an evacuation 304 phase. A garbage collector can scan regions indicated by marked cards of a write table to determine whether the regions comprise any references to live objects that were copied to other regions in an evacuation 304 phase; if a particular region does comprise one or more references to one or more live objects that were copied to other regions in an evacuation 304 phase, the garbage collector updates the one or more references to reference the locations of the copies of the one or more live objects in the other regions. For example, a garbage collector, for a first marked card in a write table indicating a first memory region, determines that the first memory region comprises a first set of references to a set of objects that were copied to a set of locations as part of an evacuation phase, in which the garbage collector updates the first set of references to indicate the set of locations.

It should be noted that FIG. 3 is an illustrative example and can include various other processes not depicted or otherwise described in connection with FIG. 3, such as those of various garbage collection algorithms such as a Garbage-First Collector (G1) garbage collection algorithm, parallel garbage collection algorithm, Concurrent mark sweep collector (CMS) garbage collection algorithm, serial garbage collection algorithm, Continuously Concurrent Compacting Collector (C4) garbage collection algorithm, Shenandoah garbage collection algorithm, Z Garbage Collector (ZGC) garbage collection algorithm, and/or any suitable garbage collection algorithm. Additionally, one or more processes described in connection with FIG. 3 can be performed in any suitable order, such as sequential, parallel, and/or variations thereof.

Figure 4:
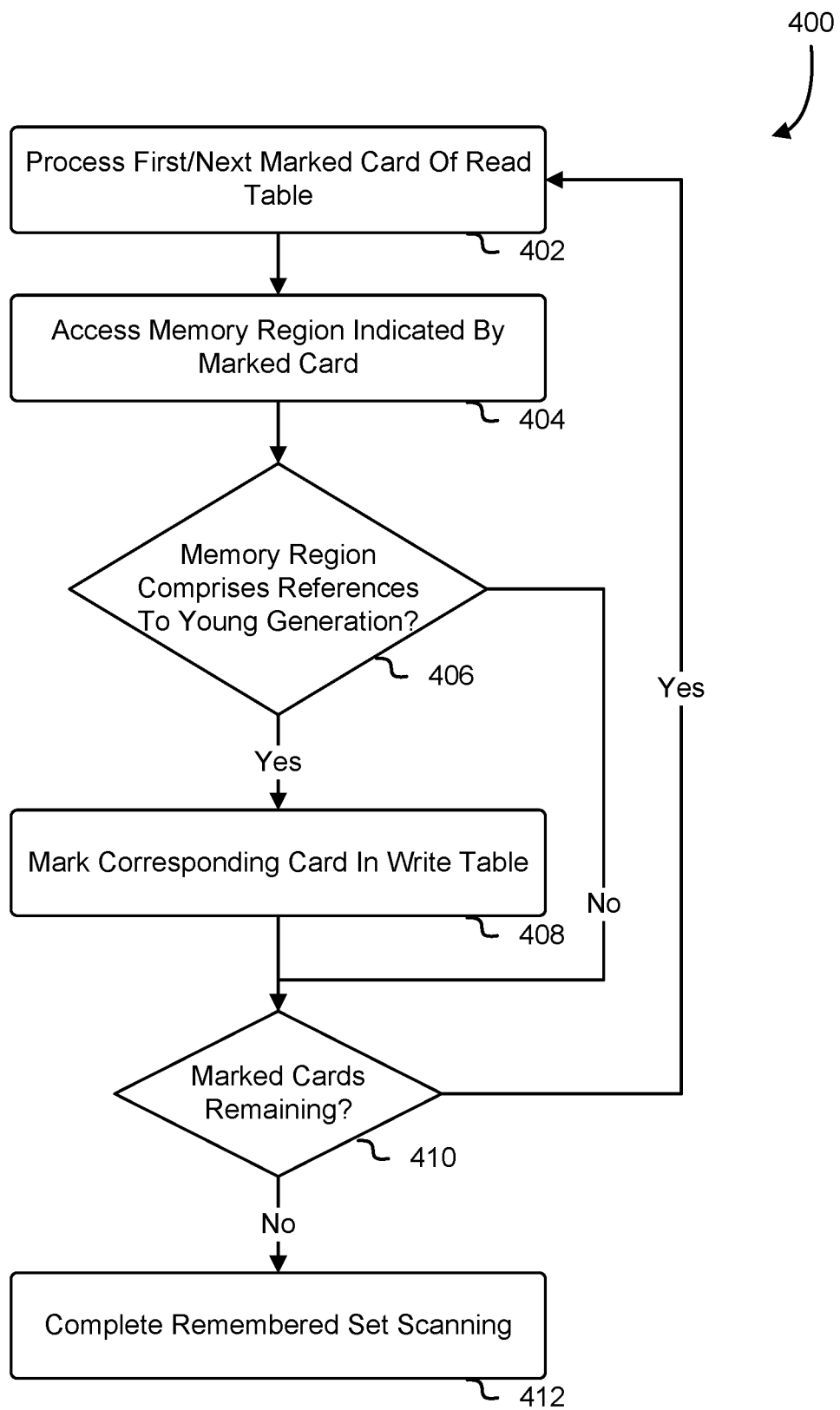
FIG. 4 shows an illustrative example of a process to perform marking, in accordance with at least one embodiment.

FIG. 4 shows an illustrative example of a process 400 to perform marking, in accordance with at least one embodiment. Some or all of process 400 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 400 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 400 is performed at least in part on a system such as those described elsewhere in this disclosure. Process 400 can be performed by a system such as a garbage collector as described in connection with FIG. 1.

A garbage collector can perform garbage collection for an application to reclaim memory used by objects not in use by the application. Garbage collection can comprise various phases, such as a marking phase, an evacuation phase, an update reference phase, and/or other suitable phases. A garbage collector can divide memory into a young generation space, in which newly allocated objects exist, and an old generation space, in which objects that have persisted through various passes of the garbage collector exist. A garbage collector can utilize a remembered set in a marking phase of young generation garbage collection. A remembered set can be a data structure that encodes information indicating regions of memory in old generation that can comprise references to objects in young generation. A remembered set can be represented by a card table, which can be an array of bytes, in which each byte is referred to as a card and corresponds to a particular memory region (e.g., a range of memory addresses). In an embodiment, process 400 is one or more processes of concurrent remembered set scanning, which can be part of a marking phase of garbage collection.

A system performing at least a part of process 400 can maintain two card tables. A first table can be identified through a first identifier as a read table, and a second table can be identified through a second identifier as a write table. The system can swap the first table and the second table such that the first table is identified through the second identifier as a write table and the second table is identified through the first identifier as a read table at the start of each marking phase. For example, at a start of a marking phase, a first table is identified through a first identifier as a read table and second table is identified through a second identifier as a write table, in which a system swaps the first table and the second table such that the first table is identified through the second identifier as a write table and the second table is identified through the first identifier as a read table, then in a start of a subsequent marking phase, the system swaps the first table and the second table such that the first table is now identified through the first identifier as a read table and the second table is identified through the second identifier as a write table, and so on for each subsequent marking phase. In some examples, the first table that is identified as a read table is also referred to as an inactive table or inactive copy, and the second table that is identified as a write table is also referred to as an active table or active copy.

In an embodiment, a system performing at least a part of process 400 includes executable code to at least process 402 a first/next marked card of a read table. The read table can refer to a card table that is indicated by a read table identifier. The system can process each marked card of the read table. The marked cards, also referred to as marked entries, can correspond to regions of memory that can comprise references to young generation objects. The read table can indicate regions of memory in old generation. The marked cards can correspond to regions of memory in old generation.

In an embodiment, a system performing at least a part of process 400 includes executable code to at least access 404 a memory region indicated by a marked card. The system can access a memory region indicated by a first/next marked card of the read table. In some examples, the memory region corresponds to a memory page, range of memory address, or any suitable memory region. The memory region can be a region of memory in old generation.

In an embodiment, a system performing at least a part of process 400 includes executable code to at least determine 406 whether a memory region comprises references to young generation objects. The system can access the memory region and process data the memory region comprises. The system can process each object of the memory region and determine whether any objects comprise references to young generation objects. A reference to a young generation object can refer to data that references or otherwise indicates an object in young generation, such as through a location of the object. In an embodiment, a system performing at least a part of process 400 includes executable code to at least, if a memory region comprises no references to young generation objects, proceed to 410.

In an embodiment, a system performing at least a part of process 400 includes executable code to at least, if a memory region comprises one or more references to one or more young generation objects, mark 408 a corresponding card in a write table. The write table can refer to a card table that is indicated by a write table identifier. The system can mark the card in the write table that corresponds to the memory region. The system can mark a card by changing one or more values of one or more bits of the card to a value of 1, or any suitable value, to indicate that the card is marked, also referred to as dirtied. A marked card can indicate that a memory region corresponding to the marked card comprises a reference to a young generation object.

In an embodiment, a system performing at least a part of process 400 includes executable code to at least determine 410 whether any marked cards remain. The system can analyze a read table to determine if any marked cards remain to be processed. The system can determine whether any marked cards remain by determining whether any marked cards of a read table remain to be processed. In an embodiment, a system performing at least a part of process 400 includes executable code to at least, if marked cards remain, proceed to 402. The system can process each marked card of a read table.

In an embodiment, if no marked cards remain, a system performing at least a part of process 400 includes executable code to at least complete 412 remembered set scanning. The system can complete remembered set scanning after scanning each memory region indicated by each marked card of a read table. The system can then zero out contents of a read table in preparation for subsequent garbage collection passes. The system can overwrite contents of a read table with values of zero.

In an embodiment, one or more processes of process 400 occur concurrently with execution of an application. One or more processes of an application can be performed by mutator threads, in which the mutator threads can execute concurrently with a garbage collector performing one or more processes of process 400. In some examples, mutator threads mark one or more appropriate cards in a write table (e.g., a card corresponding to a memory region where the mutator threads write a reference to a young generation object) concurrently while garbage collection threads also mark one or more appropriate cards (e.g., a card corresponding to a memory region where the garbage collection threads determine comprises a reference to a young generation object) in the write table. Further information regarding garbage collection threads and mutator threads can be found in the description of FIG. 1. One or more processes of process 400 can occur in any suitable manner, such as sequential, parallel, and/or variations thereof.

Figure 5:
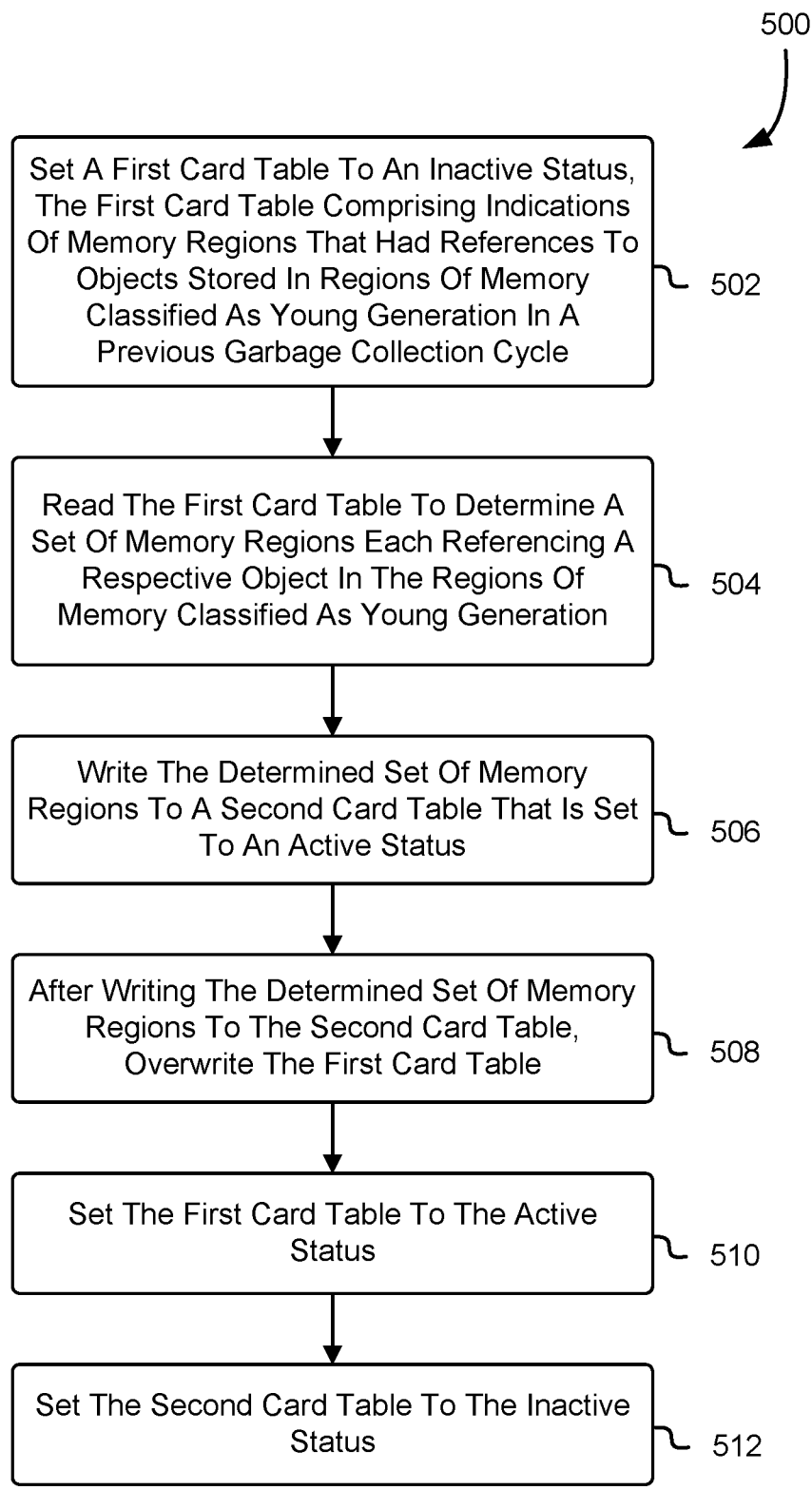
FIG. 5 shows an illustrative example of a process to perform concurrent remembered set scanning, in accordance with at least one embodiment.

FIG. 5 shows an illustrative example of a process 500 to perform concurrent remembered set scanning, in accordance with at least one embodiment. Some or all of process 500 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 500 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In an embodiment, process 500 is performed at least in part on a system such as those described elsewhere in this disclosure. Process 500 can be performed by a system such as a garbage collector as described in connection with FIG. 1.

In an embodiment, a system performing at least a part of process 500 includes executable code to at least set 502 a first card table to an inactive status, the first card table comprising indications of memory regions that had references to objects stored in regions of memory classified as young generation in a previous garbage collection cycle. The inactive status can be indicated by a read table identifier. The system can set the first card table to the inactive status by setting the read table identifier to indicate the first card table. The indications of memory regions that had references to objects stored in regions of memory classified as young generation in a previous garbage collection cycle can indicate results or data of the previous garbage collection cycle. For example, in the previous garbage collection cycle, the system indicated the memory regions that had references to objects stored in regions of memory classified as young generation in the first card table, which was set to an active status in the previous garbage collection cycle. The indications of memory regions that had references to objects stored in regions of memory classified as young generation in a previous garbage collection cycle can refer to marked cards of the first card table. For example, the first card table comprises a first marked card that indicates a memory region that had at least a reference to an object in young generation in the previous garbage collection cycle. The previous garbage collection cycle can immediately precede a current garbage collection cycle of the system.

In an embodiment, a system performing at least a part of process 500 includes executable code to at least read 504 the first card table to determine a set of memory regions each referencing a respective object in the regions of memory classified as young generation. The system can read the first card table to determine one or more memory regions corresponding to one or more marked cards of the first card table. The system can access and scan the one or more memory regions to determine whether any of the one or more memory regions comprise a reference to an object in young generation. The system can determine the set of memory regions from the one or more memory regions accessed, in which each memory region of the set of memory regions comprises at least a reference to an object in young generation. The first card table can indicate regions of memory classified as old generation.

In an embodiment, a system performing at least a part of process 500 includes executable code to at least write 506 the determined set of memory regions to a second card table that is set to an active status. The active status can be indicated by a write table identifier. The write table identifier can indicate the second card table. The system can write the determined set of memory regions to the second card table by marking cards in the second card table that correspond to the determined set of memory regions. For example, for a first memory region of the determined set of memory regions, the system writes the first memory region to the second card table by marking a card corresponding to the first memory region in the second card table. The second card table can store indications of the determined set of memory regions, which can be referred to as results or data from a current garbage collection cycle. The indications of the determined set of memory regions can also be referred to as results of the determination. The system can update the second card table based on the first card table by writing the determined set of memory regions to the second card table, in which the determined set of memory regions are one or more memory regions of the memory regions indicated by the first card table. The determined set of memory regions can be in regions of memory classified as old generation.

In an embodiment, a system performing at least a part of process 500 includes executable code to at least, after writing the determined set of memory regions to the second card table, overwrite 508 the first card table. The system can overwrite the first card table by un-marking each marked card of the first card table. The system can overwrite the first card table by zeroing out the first card table. The system can overwrite the first card table by overwriting one or more values of the first card table with a value of zero, or any suitable value. The system can overwrite the first card table such that each card of the first card table is not marked.

In an embodiment, a system performing at least a part of process 500 includes executable code to at least set 510 the first card table to the active status. The system can set the first card table to the active status after writing the determined set of memory regions to the second card table. The system can set a write table identifier that denotes the active status to indicate the first card table. In some embodiments, the system obtains a card table and sets the card table to the active status. For example, the system can instantiate and store a new card table, and set the new card table to the active status to be utilized in a subsequent garbage collection cycle. The system can set any suitable card table, such as a card table previously set to an inactive status, a new card table, a previously stored card table, and/or variations thereof, to the active status to be utilized in a subsequent garbage collection cycle. In an embodiment, a system performing at least a part of process 500 includes executable code to at least set 512 the second card table to the inactive status. The system can set the second card table to the inactive status after writing the determined set of memory regions to the second card table. The system can set a read table identifier that denotes the inactive status to indicate the second card table. In some examples, a system can switch statuses of the first card table and the second card table by setting the first card table to the active status and setting the second card table to the inactive status in a subsequent garbage collection phase, such as in a subsequent marking phase. The subsequent garbage collection phase can be part of an immediately subsequent garbage collection cycle.

In an embodiment, one or more processes of process 500 occur concurrently with execution of an application. One or more processes of an application can be performed by mutator threads, in which the mutator threads can execute concurrently with a garbage collector performing one or more processes of process 500. Mutator threads can write a second set of memory regions to the second card table that is set to the active status. Further information regarding garbage collection threads and mutator threads can be found in the description of FIG. 1. One or more processes of process 500 can occur in any suitable manner, such as sequential, parallel, and/or variations thereof.

Figure 6:
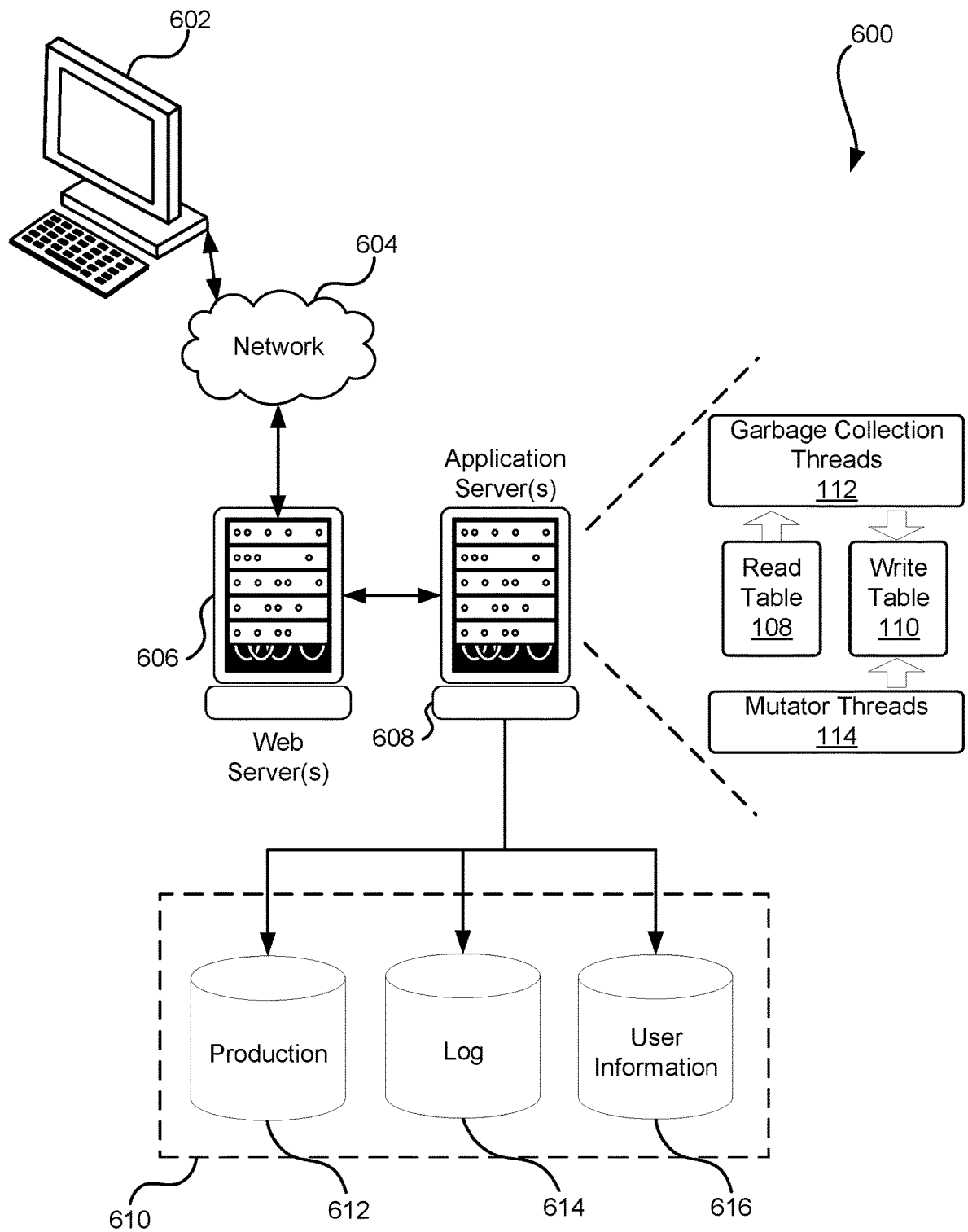
FIG. 6 illustrates a system in which various embodiments can be implemented.

FIG. 6 illustrates aspects of an example system 600 for implementing aspects in accordance with an embodiment. As will be appreciated, although a web-based system is used for purposes of explanation, different systems can be used, as appropriate, to implement various embodiments. In an embodiment, the system includes an electronic client device 602, which includes any appropriate device operable to send and/or receive requests, messages, or information over an appropriate network 604 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 606 for receiving requests and serving content in response thereto, although for other networks an alternative device serving a similar purpose could be used as would be apparent to one of ordinary skill in the art.

In an embodiment, the illustrative system includes at least one application server 608 and a data store 610, and it should be understood that there can be several application servers, layers or other elements, processes, or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which can include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In some examples, the application server 608 implements one or more garbage collectors such as those described elsewhere in this disclosure. The application server 608 can implement one or more garbage collectors that perform concurrent remembered set scanning. A garbage collector can maintain two card tables. A garbage collector can maintain a card table indicated by a read table 108. A garbage collector can maintain a card table indicated by a write table 110. Garbage collection threads 112 can be threads of a garbage collector. Mutator threads 114 can be threads of one or more applications executed by the application server 608. Garbage collection threads 112 can perform remembered set scanning in which one or more threads of the garbage collection threads 112 determine memory regions to scan based on a card table indicated by a read table 108, and mark cards in a card table indicated by a write table 110 that correspond to memory regions that comprise references to objects in young generation.

Garbage collection threads 112 can perform remembered set scanning concurrently with execution of mutator threads 114. In some examples, mutator threads 114 mark one or more appropriate cards in a card table indicated by a write table 110 (e.g., a card corresponding to a memory region where the mutator threads 114 write a reference to a young generation object) concurrently while garbage collection threads 112 mark one or more appropriate cards (e.g., a card corresponding to a memory region where the garbage collection threads 112 determine comprises a reference to a young generation object) in the card table indicated by the write table 110. Further information regarding garbage collection threads and mutator threads can be found in the description of FIG. 1.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 610, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 612 and user information 616, which are used to serve content for the production side. The data store also is shown to include a mechanism for storing log data 614, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 610.

The data store 610, in an embodiment, is operable, through logic associated therewith, to receive instructions from the application server 608 and obtain, update, or otherwise process data in response thereto, and the application server 608 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 602. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 600 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 600, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless, and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system can be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes can be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. In some embodiments, a set is an empty set comprising no members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on." A region can refer to any suitable logical grouping, such as of a grouping of memory, and can comprise other regions. For example, a region of memory comprises one or more regions of memory.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   setting a first card table to an inactive status denoted by a first identifier, the first card table comprising indications of memory regions that had references to objects stored in regions of memory classified as young generation in a previous garbage collection cycle;
   reading the first card table to determine a set of memory regions each referencing a respective object in the regions of memory classified as young generation;
   writing the determined set of memory regions to a second card table that is set to an active status denoted by a second identifier; and
   after writing the determined set of memory regions to the second card table:
      overwriting the first card table;
      setting the first card table to the active status and indicating the active status using the second identifier; and
      setting the second card table to the inactive status and indicating the inactive status using the first identifier.

2. The computer-implemented method of claim 1, further comprising allowing an application to write a second set of memory regions to the second card table while the second card table is set to the active status.

3. The computer-implemented method of claim 1, further comprising:
   designating the regions of memory classified as young generation for storing data objects for a predetermined number of garbage collection cycles; and
   designating different regions of memory classified as old generation for storing the data objects after the predetermined number of garbage collection cycles, wherein the different regions of memory comprise the determined set of memory regions.

4. The computer-implemented method of claim 1, further comprising:
   after setting the first card table to the active status and setting the second card table to the inactive status:
      reading the second card table to determine a second set of memory regions each referencing a respective object in the regions of memory classified as young generation; and
      writing the second set of memory regions to the first card table.

5. A system, comprising:
   one or more processors; and
   memory that stores computer-executable instructions that are executable by the one or more processors to cause the system to:
      store a first data structure and a second data structure, wherein:
         the first data structure is set to an inactive status, the inactive status denoted by a first identifier, and stores results from a previous garbage collection cycle; and
         the second data structure is set to an active status, the active status denoted by a second identifier, and stores results from a current garbage collection cycle;
      update the second data structure based at least in part on the first data structure; and
      set the second data structure to the inactive status, by denoting the inactive status using the first identifier, for another garbage collection cycle.

6. The system of claim 5, wherein the instructions to update the second data structure based at least in part on the first data structure further include instructions that are executable by the one or more processors to cause the system to:
   access a first memory region indicated by the first data structure;
   determine whether the first memory region comprises a reference to an object in a set of memory regions; and
   indicate results of the determination in the second data structure.

7. The system of claim 5, wherein the instructions further include instructions that are executable by the one or more processors to cause the system to:
   zero out the first data structure; and
   set the first data structure to the active status for the other garbage collection cycle.

8. The system of claim 5, wherein:
   the instructions further include instructions that are executable by the one or more processors to cause the system to, after at least updating the second data structure based at least in part on the first data structure:
      cause the second identifier to indicate the first data structure.

9. The system of claim 5, wherein one or more mutator threads execute concurrently at least while the second data structure is set to the active status, wherein the one or more mutator threads are able to write to the second data structure.

10. The system of claim 5, wherein the results from the previous garbage collection cycle indicate at least a region of memory that comprised a reference to an object in a set of memory regions classified as young generation in the previous garbage collection cycle.

11. The system of claim 5, wherein the results from the current garbage collection cycle indicate at least a region of memory that comprises a reference to an object in a set of memory regions classified as young generation in the current garbage collection cycle.

12. The system of claim 5, wherein the other garbage collection cycle is an immediately subsequent garbage collection cycle.

13. A non-transitory computer-readable storage medium storing thereon executable instructions that, as a result of being executed by one or more processors of a computer system, cause the computer system to:
- update a second data structure based at least in part on a first data structure, the first data structure comprising data from a previous garbage collection cycle of a garbage collection application and having a status denoted by a first identifier, and the second data structure comprising data from a current garbage collection cycle of the garbage collection application and having a status denoted by a second identifier;
- allow an application to update the second data structure during the current garbage collection cycle; and
- responsive to the second data structure being updated, denote the status of the first data structure using the second identifier and denote the status of the second data structure using the first identifier.

14. The non-transitory computer-readable storage medium of claim 13, wherein the instructions further comprise instructions that, as a result of being executed by the one or more processors, cause the computer system to utilize the second data structure to update one or more references in one or more memory regions indicated by the second data structure, in which the one or more references correspond to one or more data objects moved as part of the current garbage collection cycle.

15. The non-transitory computer-readable storage medium of claim 13, wherein:
- the second data structure is set to a write status and the first data structure is set to a read status; and
- the instructions further comprise instructions that, as a result of being executed by the one or more processors, cause the computer system to, after at least updating the second data structure based at least in part on the first data structure, set the second data structure to the read status.

16. The non-transitory computer-readable storage medium of claim 15, wherein the instructions further comprise instructions that, as a result of being executed by the one or more processors, cause the computer system to:
- obtain a third data structure; and
- set the third data structure to the write status.

17. The non-transitory computer-readable storage medium of claim 13, wherein the application updates the second data structure based at least on a memory region denoted as old generation where the application writes a reference to an object in a memory region denoted as young generation.

18. The non-transitory computer-readable storage medium of claim 13, wherein the instructions to update the second data structure further comprise instructions that, as a result of being executed by the one or more processors, cause the computer system to mark one or more entries of the second data structure that correspond to one or more memory regions denoted as old generation that comprise one or more references to one or more objects in one or more memory regions denoted as young generation.

19. The non-transitory computer-readable storage medium of claim 13, wherein the first data structure comprises one or more marked entries that correspond to one or more memory regions denoted as old generation that comprised one or more references to one or more objects in one or more memory regions denoted as young generation in the previous garbage collection cycle.

20. The non-transitory computer-readable storage medium of claim 19, wherein the instructions further comprise instructions that, as a result of being executed by the one or more processors, cause the computer system to, after at least updating the second data structure based at least in part on the first data structure, unmark the one or more marked entries of the first data structure.

* * * * *